(12) United States Patent
Gutman et al.

(10) Patent No.: US 7,801,183 B2
(45) Date of Patent: Sep. 21, 2010

(54) SYNCHRONOUS TRANSMISSION OVER PACKET BASED NETWORK

(75) Inventors: Ron Gutman, Zichron-Yaakov (IL); Doron Segev, Tel-Aviv (IL)

(73) Assignee: Imagine Communications Ltd., I. Z. Poleg, Netanya (IL)

( * ) Notice: Subject to any disclaimer, the term of this patent is extended or adjusted under 35 U.S.C. 154(b) by 421 days.

(21) Appl. No.: 11/808,631

(22) Filed: Jun. 12, 2007

(65) Prior Publication Data

US 2007/0286234 A1    Dec. 13, 2007

(30) Foreign Application Priority Data

Jun. 13, 2006    (IL) ........................ 176288

(51) Int. Cl.
*H04J 3/00*    (2006.01)
(52) U.S. Cl. ...................... 370/498; 370/464
(58) Field of Classification Search ................. 370/498, 370/508, 458, 468, 464
See application file for complete search history.

(56) References Cited

U.S. PATENT DOCUMENTS

| | | | | |
|---|---|---|---|---|
| 5,930,263 | A * | 7/1999 | Nielsen | ........................ 370/465 |
| 6,038,230 | A | 3/2000 | Ofek | |
| 6,195,355 | B1 * | 2/2001 | Demizu | ........................ 370/397 |
| 6,292,487 | B1 | 9/2001 | Kunito et al. | |
| 6,721,334 | B1 * | 4/2004 | Ketcham | ..................... 370/473 |
| 6,747,996 | B2 * | 6/2004 | Holloway et al. | ............ 370/503 |
| 6,888,848 | B2 * | 5/2005 | Beshai et al. | ................ 370/474 |
| 6,907,066 | B1 * | 6/2005 | Nayler | ........................ 375/239 |
| 7,002,993 | B1 * | 2/2006 | Mohaban et al. | ............. 370/471 |
| 7,082,167 | B2 | 7/2006 | Alexandre et al. | |
| 7,305,492 | B2 * | 12/2007 | Bryers et al. | ................. 709/249 |
| 7,515,605 | B2 * | 4/2009 | Harel et al. | .................. 370/466 |
| 7,516,234 | B2 * | 4/2009 | Schoenblum | ............... 709/231 |
| 2002/0163932 | A1 * | 11/2002 | Fischer et al. | ............... 370/465 |
| 2004/0076187 | A1 | 4/2004 | Peled | |
| 2004/0196857 | A1 * | 10/2004 | Holloway et al. | ............ 370/401 |
| 2005/0060418 | A1 * | 3/2005 | Sorokopud | ................... 709/230 |
| 2005/0232307 | A1 * | 10/2005 | Andersson et al. | ........... 370/503 |
| 2006/0126660 | A1 * | 6/2006 | Denney et al. | ............... 370/468 |
| 2006/0195881 | A1 | 8/2006 | Segev et al. | |
| 2007/0121678 | A1 * | 5/2007 | Brooks et al. | ................ 370/505 |

FOREIGN PATENT DOCUMENTS

| | | |
|---|---|---|
| GB | 2 359 702 | 8/2001 |
| WO | WO 03/003630 | 1/2003 |
| WO | WO 2004/025405 | 3/2004 |

* cited by examiner

*Primary Examiner*—Chi H Pham
*Assistant Examiner*—Robert Lopata
(74) *Attorney, Agent, or Firm*—Robert G. Lev, Esq.

(57) ABSTRACT

A method of transmission over a packet based network including providing data packets to be transmitted on the packet based network during a predetermined time interval and arranging the provided data packets in a transmission block according to desired transmission times of the data packets, such that one or more gaps remain between at least some of the data packets. The method further includes adding padding bytes to the transmission block in a manner which substantially fills the one or more gaps and providing the block for transmission on the packet based network.

19 Claims, 4 Drawing Sheets

SYNCHRONOUS TRANSMISSION OVER PACKET BASED NETWORK

FIELD OF THE INVENTION

The present invention relates to communication systems and in particular to systems requiring low jitter levels.

BACKGROUND OF THE INVENTION

Packets transmitted over a link of a packet based network connecting a source to a destination receiver do not necessarily arrive exactly a predetermined time after they are provided for transmission by an application layer of the source. Rather, different packets have different end-to-end transmission times through the network. The difference between the transmission times of different packets from the source to the receiver is referred to as jitter. The receiver generally reorganizes the packets in a reception buffer, which regulates their timing and reorders the packets if necessary.

It is generally desirable to minimize the jitter, so that the jitter buffer of the receiver can be relatively small and in order to reduce the end-to-end delay, which is affected by the largest expected jitter. Reducing the jitter also reduces the processing complexity of the receiver. Furthermore, some network devices cannot operate at high jitter levels.

The overall jitter is formed of two types of jitter: network jitter, which is due to variations in delays along the network, and transmitter jitter, which is due to variations in the packet transmission times at the transmitter itself.

Many methods have been suggested for overcoming network jitter.

U.S. Pat. No. 6,038,230 to Ofek, the disclosure of which is incorporated herein by reference, describes a transmission method in which packets are transmitted between links in predefined periodic intervals.

PCT publication WO03/003630 to Wetzel et al., the disclosure of which is incorporated herein by reference, describes a method of distributing time stamps in order to overcome problems associated with jitter.

U.S. patent publication 2004/0076187 to Peled, the disclosure of which is incorporated herein by reference, describes a method of synchronizing between communication terminals of asynchronous packet networks.

UK patent publication GB 2 359 702 to Humpleman, the disclosure of which is incorporated herein by reference, describes transmission of MPEG video data over a home Ethernet network. To prevent jitter, the MPEG clock of the signals is locked to an internal network clock, so that the receiver can use the internal network clock for timing the signals.

These patents relate to network jitter, but do not deal with the problem of transmitter jitter.

In private networks, the problem of network jitter is less severe, since the owner of the network can limit the use of the network only to packets from a single transmission point.

If a low transmitter jitter is desired, the transmitter needs to accurately time the packets it transmits in order to avoid jitter. This is generally performed by a transmitter with an accurate clock, which clock generates an interrupt which initiates a transmission process each time a packet is to be transmitted. Such frequent interrupts are burdensome on the transmitter, as performing the interrupt requires substantial resources. U.S. Pat. No. 6,907,066 to Nayler, titled "Arrangement for reducing transmitted jitter", the disclosure of which is incorporated herein by reference, describes one such transmitter.

U.S. Pat. No. 6,292,487 to Kunito et al., titled "Data Transmission System and Method", the disclosure of which is incorporated herein by reference, describes an ATM data transmission system, in which the time of transmitting packets is adjusted according to the rate at which the data is received by the transmission system.

Such transmitters, however, are very processing intensive, due to the need to perform I/O operations at a very high rate and perform interrupts at a high rate. Therefore, some systems prefer stacking together a block of data that is transmitted together, although this causes jitter of at least the size of the block.

SUMMARY OF THE INVENTION

An aspect of some embodiments of the present invention relates to a transmitter for transmitting information packets with low transmitter jitter onto a network link. The transmitter accumulates a plurality of data packets for transmission together, in order to avoid performing frequent I/O interrupts. Before transmission of the accumulated data packets, the transmitter generates padding bytes (or bits) which are placed between the data packets in a manner which preserves a desired relative timing between the data packets.

In some embodiments of the invention, the padding bytes include padding packets which have lengths selected to require a transmission time that preserves a desired timing between the data packets. Padding packets may be placed between each pair of data packets or between each group of data packets, depending on the relative utilization of the network link and the desired timing. Alternatively or additionally to including some or all of the padding bytes in separate padding packets, some or all of the padding bytes are appended to the data packets and are not included in separate padding packets.

In some embodiments of the invention, the padding packets together with the accumulated data packets entirely fill the capacity of the network link onto which the packets are transmitted, for a time period until a next transmission. The padding packets accurately keep the data packets in their intended transmission location on the link, relative to each other, until after the packets leave the transmitter, and thus transmitter jitter is overcome. The padding bytes are optionally discarded by a first network node (e.g., a switch or router) along the network link.

It is noted that once the data packets reach the first network node with a desired timing, the timing will not substantially change, except for network based jitter which is relatively negligible, regardless of whether the padding bytes are forwarded further along the network.

In some embodiments of the invention, the transmitter generates, for each time slot of the link, a data array of the size of the capacity of the time slot. Streaming media to be transmitted in the time slot is fit into the array and the remaining locations are filled with padding packets. The entire array is then provided to the network for transmission.

There is therefore provided in accordance with an exemplary embodiment of the invention, a method of transmission over a packet based network, comprising providing data packets to be transmitted on the packet based network during a predetermined time interval, arranging the provided data packets in a transmission block according to desired transmission times of the data packets, such that one or more gaps remain between at least some of the data packets, adding padding bytes to the transmission block in a manner which substantially fills the one or more gaps and providing the block for transmission on the packet based network.

Optionally, adding padding bytes to the transmission block comprises adding padding bytes to one or more of the data packets. Optionally, adding padding bytes to the transmission block comprises adding padding packets. Optionally, adding padding packets comprises adding packets having an error which causes them to be discarded by standard routers. Optionally, adding padding packets comprises adding packets having a same source and destination address or a zero or one time to live value. Optionally, each padding packet has a size of at least 40 bytes. Optionally, adding padding bytes to the transmission block comprises adding such that the data packets and the padding bytes are together of a size substantially equal to a capacity of the packet based network during the predetermined time interval.

Optionally, adding the padding bytes comprises adding such that the data packets and the padding bytes are together not smaller by more than 100 bytes from a capacity of the packet based network during the predetermined time interval.

Optionally, adding the padding bytes comprises adding such that the provided data and padding bytes together occupy at least 99% of the capacity of the packet based network during the predetermined time interval. Optionally, the predetermined time interval is longer than 10 milliseconds. Optionally, providing the data packets comprises providing real time media packets. Optionally, providing the data packets to be transmitted comprises providing from a plurality of video streams having a same data rate or alternatively, at least two of which have different data rates. Optionally, arranging the data packets comprises defining a plurality of channels, dividing the block into a plurality of cycles including a packet for each of the channels and placing a padding packet between each of the cycles. Optionally, adding the padding bytes comprises adding after the data packets were arranged in the block. Optionally, adding the padding bytes comprises adding at least one padding packet to the block before the data packets were arranged in the block. Optionally, arranging the data in the transmission block comprises overwriting one or more padding packets with one or more data packets.

There is further provided in accordance with an exemplary embodiment of the invention, a packet based network transmitter, comprising a packet based network interface, a data input unit and a processor adapted to arrange data packets received through the data input unit for transmission through the packet based network interface during a predetermined time into a block according to desired transmission times of the packets, with one or more gaps between the data packets, and to add padding bytes to the one or more gaps in a manner which substantially fills the one or more gaps. Optionally, the packet based network interface is configured to be periodically initiated to consecutively transmit the packets in the block, with a period of less than 20 times a second. Optionally, the block has a size of at least 99% of the capacity of the network interface during the predetermined time. Optionally, the network transmitter comprises a VoD server or a physical multiplexer.

BRIEF DESCRIPTION OF FIGURES

Exemplary non-limiting embodiments of the invention will be described with reference to the following description of embodiments in conjunction with the figures. Identical structures, elements or parts which appear in more than one figure are preferably labeled with a same or similar number in all the figures in which they appear, in which.

DETAILED DESCRIPTION OF EMBODIMENTS

Figure 1:
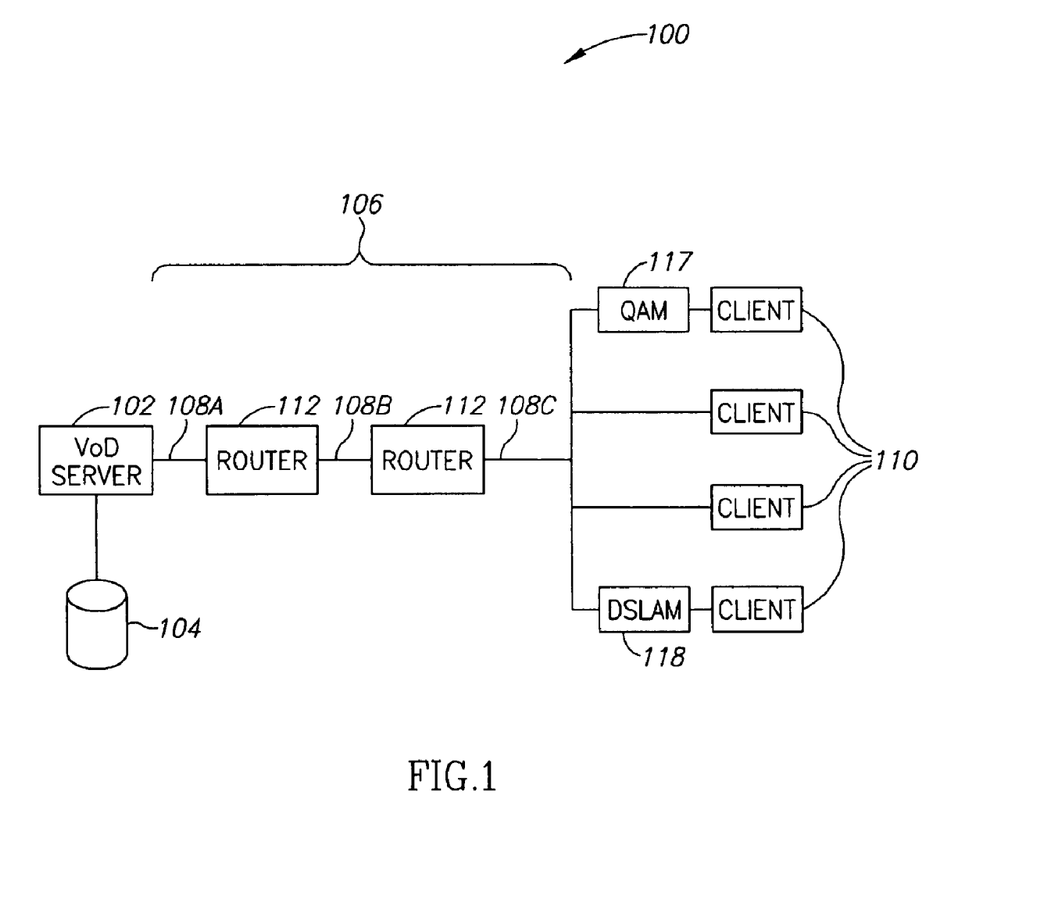
FIG. 1 is a schematic illustration of a video delivery system, in accordance with an exemplary embodiment of the invention.

FIG. 1 is a schematic illustration of a video delivery system 100, in accordance with an exemplary embodiment of the invention. System 100 includes a video on demand (VoD) server 102, which has one or more storage units 104. VoD server 102 transmits a plurality of media streams, optionally formed of packets, to one or more clients 110, which may be, for example, set-top boxes, computers or wireless receivers. The packets from VoD sever 102 to clients 110 are optionally transmitted over a packet based network 106, such as an Ethernet network. Network 106 includes links 108 (marked 108A, 108B, 108C) connected through switches or routers 112. Links 108 may be of any type known in the art, for example 1 Gbit or 10 Gbit Ethernet links. In some embodiments of the invention, network 106 includes for one or more of clients 110, an access unit, such as a digital subscriber line access multiplexer (DSLAM) 118 or a quadrature amplitude modulation (QAM) modulator 117, which provides a last mile connection of the network to the clients.

Media streams provided by VoD server 102 are optionally transmitted with minimal transmitter jitter, by adding padding packets to the data packets transmitted onto network 106 in a manner which sets a desired time relation between the data packets.

In some embodiments of the invention, network jitter is considered negligible and ignored. Alternatively, VoD server 102 is optionally the only unit transmitting packets onto network 106, such that there is no problem of congestion, and resulting delay, in the network. Further alternatively or additionally, any other method known in the art is used to overcome network jitter.

The need to limit the transmission jitter may be, for example, in order to limit the buffer size required from switches 112 and particularly from DSLAM 118, which generally does not have a large buffer.

VoD Server

Figure 2:
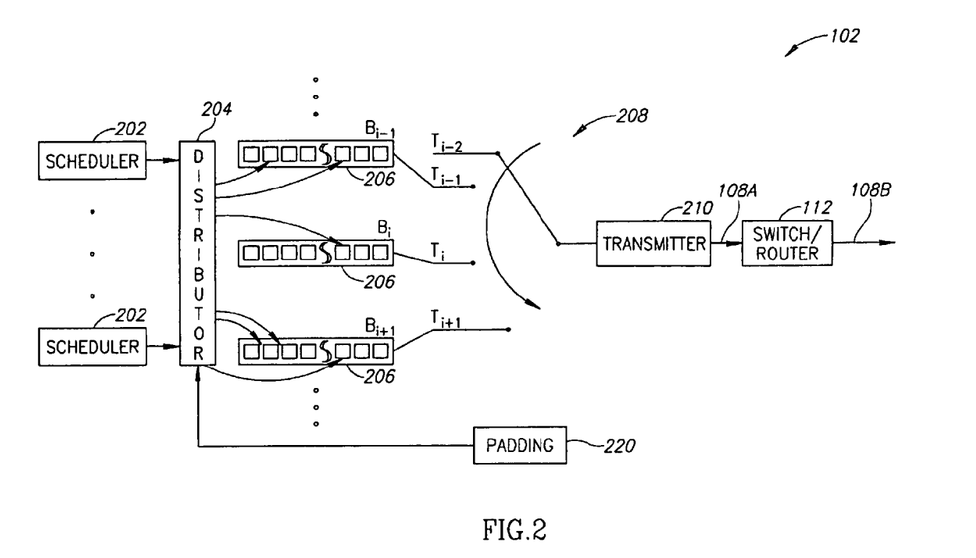
FIG. 2 is a schematic block diagram of a video server, in accordance with an exemplary embodiment of the invention.

FIG. 2 is a schematic block diagram of VoD server 102, in accordance with an exemplary embodiment of the invention. Server 102 optionally includes a data input unit, for example including a plurality of schedulers 202, which provide respective video streams to server 102. A distributor 204 receives the video signals of the streams and places them in arrays 206, in places selected according to the required timing constraints of the video streams. Each of arrays 206 is optionally of the size of the capacity of link 108A onto which the signals are transmitted by VoD server 102, during a time slot of the server. A switch 208 cyclically, for example according to a round robin procedure, provides arrays 206 to transmitter 210, at a predetermined rate synchronized with the transmission rate of network 106. Transmitter 210 transmits the packets to switch 112 over link 108A. While server 102 could include only a single array 206, in some embodiments of the invention, server 102 includes a plurality of arrays 206, optionally at least five or even at least 10, in order to allow sufficient time for arranging packets in arrays 206 before their transmission time.

Transmitter 210 is optionally set to begin its operation at given intervals, for example every 50 milliseconds, 100 milliseconds, 200 milliseconds or even every 500 milliseconds. When transmitter 210 begins to operate it consecutively takes the packets in the array 206 to which it is currently connected and passes them on to link 108A. When the packets in array 206 were all transmitted, transmitter 210 optionally goes into a sleep mode until the beginning of the next interval at which it is operated.

For a data link 108A of a capacity of 1 Gbps, operating transmitter 210 every 100 milliseconds corresponds to an array size (of arrays 206) of at least 100 Mbits. Operating transmitter 210 every 200 milliseconds corresponds for a 1 Gbps link to an array size of at least 200 Mbits. It is noted that transmitter 210 may be operated at a higher rate, for example of at least 10 Hz, 50 Hz or even at least 100 Hz. In accordance with these alternatives, arrays 206 are smaller than mentioned above. It is noted, however, that the use of a relatively low transmission rate makes the implementation of transmitter 210 relatively simple, as the amount of resources expanded on managing an operating system in switching control due to interrupts depends on the rate at which the interrupts are initiated.

Distributor 204 optionally determines for each packet from schedulers 202, a due time for transmission of the packet and accordingly places the packet in a location in one of arrays 206, for example in a current array 206. For example, if a packet is due to be transmitted a time X after the transmission of array 206 is set to begin, the packet will be placed in array 206 at a location selected such that the transmission time of the packets between the beginning of the array and the selected location is equal (or very close to) X. In some embodiments of the invention, each packet is placed in the array 206 to be transmitted at the last time before its transmission will be overdue. Alternatively or additionally, a best effort approach is used in filling arrays 206. Optionally, a contention handling method known in the art is used, to determine the order of packets of different video channels.

Filling with Padding Packets

In some embodiments of the invention, at initialization, arrays 206 are filled with padding packets. In addition, each time the contents of an array 206 are transmitted, the array is reinitialized with padding packets. Data packets inserted into arrays 206 overwrite the padding packets with which the array was initialized. Optionally, in these embodiments, the packets have predetermined fixed sizes, so that data packets precisely overwrite the padding packets placed at initialization. Alternatively or additionally, when a data packet overwrites only part of a padding packet, the padding packet is fixed, for example by correcting its length field in its header and/or by appending a tail at its new end, so that the portions that were not overwritten remain a valid packet.

Alternatively to initializing arrays 206 with padding packets, immediately before each array 206 is scheduled to be transmitted, distributor 204 determines which locations of the array 206 are not filled with data packets and these locations are filled with padding packets, provided for example by a padding unit 220.

Further alternatively or additionally, when the amount of data to be transmitted by VoD server 102 is fixed over a relatively long period, distributor 204 determines in advance a layout of arrays 206 for the current amount of data to be transmitted. The layout determines which locations will carry data packets and which locations will carry padding packets. An exemplary layout for arrays 206 is described below with reference to FIG. 4. In accordance with this alternative, padding packets may be placed in array 206 in advance (before the data packets are placed therein) in those locations which are planned not to carry data, or may be added during or after the placement of the data packets.

In some embodiments of the invention, each data packet is placed in an array 206 such that on both sides it is either immediately adjacent another data packet without a gap, or is separated from a closest neighboring data packet by at least a minimal distance sufficient to host an entire padding packet. In some embodiments of the invention, when a data packet is to be placed in a space between two previously positioned data packets, which space is slightly larger than the packet (but not sufficiently large to accommodate both the data packet and a padding packet), the packet is enlarged by padding bytes, in order to entirely fill the space.

Padding Packets

Possibly, the padding packets have headers and payload fields as regular legal packets, so that they can be handled by a standard driver of the transmitter and/or will not cause problems to a router receiving them from the transmitter. For example, in an IP environment, the padding packets possibly have a size of at least 29 bytes, including an IP header, a UDP header and at least one byte of padding payload. In some embodiments of the invention, each padding packet includes at least 41 bytes, including an IP header (20 bytes), a TCP header (20 bytes) and at least one byte of padding payload.

In some transmission environments, packets are required to have at least a minimal length. For example, in the Ethernet environment, packets are required to include at least 46 bytes. In such cases, the data and padding packets have at least such minimum lengths, so that additional bytes which may disrupt the timing are not added to the data and/or padding packets, by units along the transmission path which are adapted to enlarge packets to the minimal required size.

The padding packets possibly include erroneous headers which cause the packets to be dropped before they reach clients 110, for example by switches and/or routers 112 along the way to the clients. Optionally, the padding packets have the same source and destination addresses, for example MAC addresses, which is generally considered erroneous by many switches and/or routers. Alternatively or additionally, the packets are transmitted with a zero value time to live (TTL) field. Further alternatively or additionally, one or more of the routers 112 is configured to identify padding packets and discard them. The padding packets may be identified based on a unique source or destination IP or MAC address used, based on a unique payload and/or based on any other unique field value of the padding packets. Further alternatively or additionally, the padding packets are allowed to reach clients 110, where they are discarded.

In some embodiments of the invention, the padding packets together with the data packets substantially entirely fill the capacity of link 108A during the time between each two initiations of the operation of transmitter 210. Optionally, substantially entirely filling the capacity comprises filling at least 95%, 99% or even 99.9% of the capacity of the link 108A. Possibly, filling the capacity of link 108A leaves less than 100 bytes, 50 bytes or even less than 10 bytes unoccupied, during the time between two consecutive initiations of the operation of transmitter 210. Filling the entire capacity up to an accuracy of a negligible extent, provides for simple operation, as the link is simply all the time full and there is no leeway for skew.

Alternatively, only a portion of the capacity of link 108A is used for the data packets of server 102 and/or is used at all. Possibly, padding packets are not added between transmission of a last data packet of an operation session of transmitter 210 and a next initiation of transmitter 210, for example as is now described with reference to FIG. 3.

Figure 3:
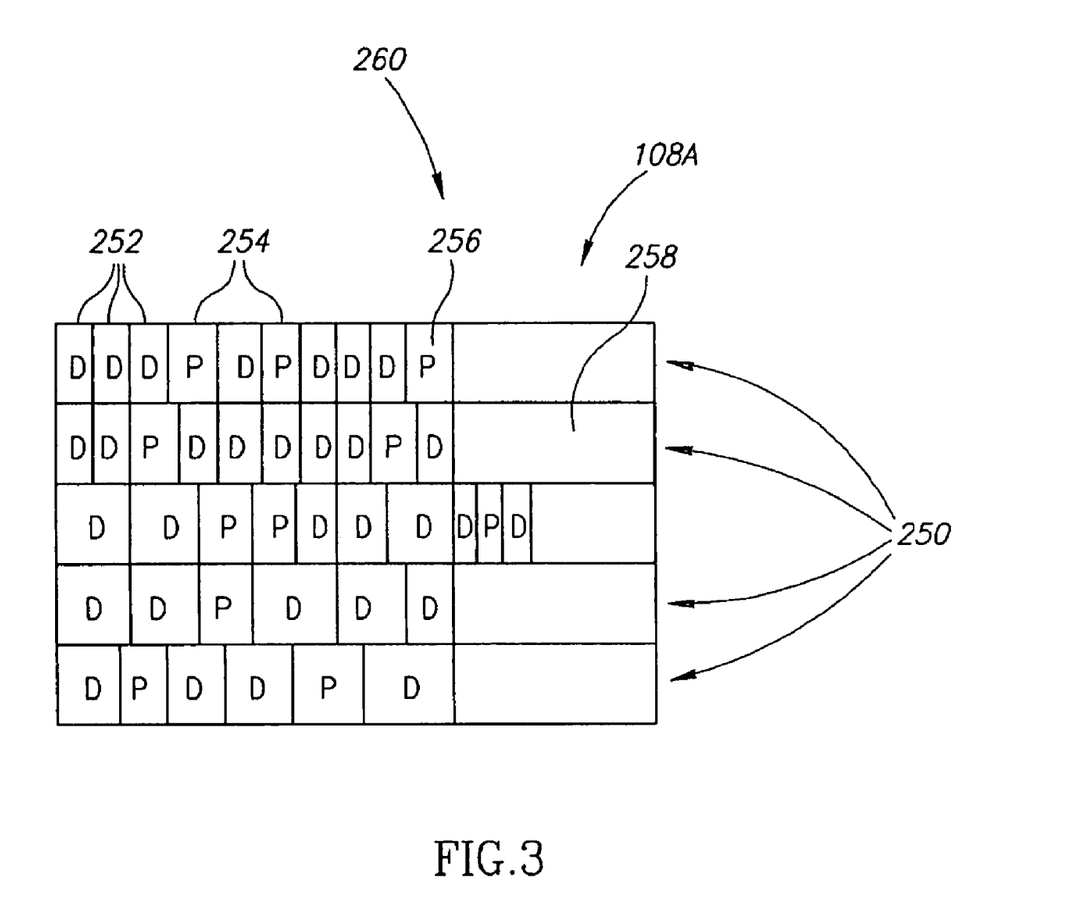
FIG. 3 is a schematic illustration of a portion of the capacity of a link, in accordance with an exemplary embodiment of the invention.

FIG. 3 is a schematic illustration of a portion of the capacity of link 108A, in accordance with an exemplary embodiment of the invention. In the exemplary embodiment of FIG. 3, between each two consecutive times that the operation of transmitter 210 is initiated, link 108A has a total capacity of a block 250. Further in this example, data packets (marked by a "D") 252 are located within blocks 250 according to their required timing. Padding packets (marked by a "P") 254, as discussed above, are placed between data packets 252 in order to set the relative timing of the data packets.

In some embodiments of the invention, a portion 258 of the capacity of link 108A, from the end of the last data packet 252 to the beginning of the next block 250 is not filled with padding packets 254, as the timing of the next block is set by the initiation timing of transmitter 210. Alternatively to not including padding packets 254 in block 250 after the last data packet 252, padding packets may be added in part of block 250, for example in order to fill block 250 at least up to a predetermined line 260, as illustrated by padding packet 256. In those blocks 250 in which there is heavy transmission and the data extends beyond line 260, the padding packets are added until the last data packet in the block 250.

In accordance with this alternative, a leading portion of the capacity of link 108A including all the data packets between two consecutive initiations of transmitter 210 is substantially entirely (e.g., at least 99% or any of the other measures discussed above) filled with data packets and padding packets. The remaining capacity of link 108A, may be used by other transmission units, may be used for other tasks, or is not used at all.

Implementation

In some embodiments of the invention, all the elements (i.e., schedulers 202, distributor 204, arrays 206, switch 208 transmitter 210 and padding unit 220) of server 102 are implemented in software on one or more processors. Alternatively or additionally, one or more of the elements of server 102 is implemented in hardware.

The filling of the padding packets optionally achieves a high accuracy with a discrepancy of less than 100 microseconds between the transmission of a specific data packet and its desired transmission time. In some embodiments of the invention, the discrepancy is smaller than 50 microseconds or even smaller than 10 microseconds.

Example

Figure 4:
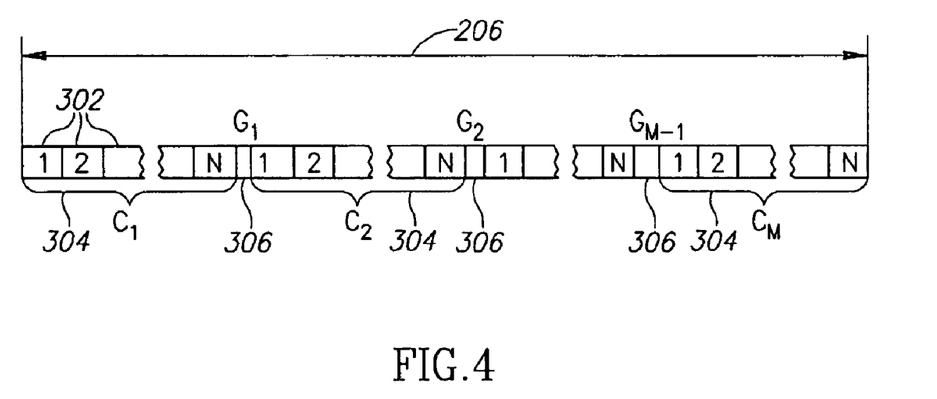
FIG. 4 is a schematic illustration of a sequence of packets provided by a switch for a single time slot of a packet based network, in accordance with an exemplary embodiment of the invention.

FIG. 4 is a schematic illustration of an exemplary predetermined layout of packets provided by N video streams, in an array 206, in accordance with an exemplary embodiment of the invention. Each array 206 is optionally divided into cycles 304, each cycle including samples 302 from each of the video streams. The samples 302 are indicated by references 1, 2 . . . N, according to the channel to which they belong. Each video stream is optionally allocated bandwidth for M samples, M being the maximal number of cycles 304 that can fit in array 206. Alternatively, M is a number of cycles required according to the signal rate of the video streams being transmitted.

Between each two cycles 304, distributor 204 (FIG. 2) optionally places one or more padding packets forming a padding gap 306. The sizes of all of gaps 306 in array 206, together with cycles 304 of the array 206 optionally fill array 206 entirely or nearly entirely, and hence entirely or nearly entirely fill the capacity of link 108A.

In some embodiments of the invention, all of gaps 306 in array 206 have a same size. Alternatively, gaps 306 may be of different sizes, between different cycles 304 in the array. Optionally, each gap 306 includes a single padding packet. Alternatively, for example when relatively large gaps 306 are used, a plurality of padding packets may be used for a single gap.

Alternatively to placing padding packets only between each two cycles 304, a larger number of gaps 306 are defined in order to allow more accurate timing of the video streams. Optionally, one or more intermediate gaps including padding packets are placed within one or more of cycles 304. Further alternatively or additionally, one or more pairs of cycles 304 are not separated by a gap 306, in order to limit the number of padding packets used (e.g., when the gaps 306 are very small). In an exemplary embodiment of the invention, a gap 306 is defined at the end of array 206 after the last cycle 304.

In an exemplary embodiment of the invention, all video carrying packets have a same size ($S_p$) and all the video streams have a same rate. Accordingly, the number (M) of cycles 304 is optionally calculated as M=floor ($S_{s1}/N \cdot S_p$), where N is the number of video channels, $S_{s1}$ is the size of array 206 and the function floor( ) takes the largest integer smaller than its operand.

The size $S_g$ of the M−1 padding packets in each array 206 are optionally determined to be of equal size, e.g., $S_g = (S_{s1} - N \cdot M \cdot S_p)/(M-1)$. Alternatively, padding packets of different sizes may be used. For example, the last padding packet in each slot may have a precise size that fills the capacity of network 106.

In some embodiments of the invention, alternatively or additionally to adding padding packets, the sizes of samples 302 are selected such that they fill the entire bandwidth of network 106, such that padding packets are not needed. Alternatively or additionally, very large arrays 206 are used (e.g., M>1000), such that the padding required is of a very small size, which even if not provided causes very little jitter.

In an exemplary embodiment of the invention, network 106 has a total capacity of 992 Mbps and each channel has a size of 3.75 Mbps. The maximal number of channels that can fit on the network is therefore N=240. For a slot time of 100 ms, each slot has a size of 12.4 Mbytes (=99.2 Mbits). Assuming a packet size of 1362 bytes, as is customary in video transmission, M=floor ($12.4 \cdot 10^6/240/1362$)=37. The size Sg of each gap 306 is therefore 8,484 bytes.

Alternatively to using the same rate for all video channels, some or all the video channels have different data rates. This alternative is optionally achieved by using packets of a plurality of different sizes and/or allotting different numbers of packets in each cycle to different channels.

In some embodiments of the invention, in accordance with this alternative, in order to limit the complexity of bandwidth allocation, the capacity of network 106 is divided into a plurality of equal size (i.e., data rate), relatively large, base channels. Each base channel is then divided into a plurality of equal size channels, although different base channels may be divided into different numbers of channels and hence different base channels may have different size channels.

In an exemplary embodiment of the invention, a base bit rate of 25 Mbps is used. Assuming network 106 has a total capacity of 992 Mbps, the maximal number of base channels that can fit on the network is N=39. For a slot time of 100 ms, each slot has a size of 12.4 Mbytes. Assuming a packet size of 1362 bytes, M=floor (12.4.10⁶/39/1362)=233. The size Sg of each gap 306 is therefore 101 bytes.

In accordance with one possibility of this exemplary embodiment of the invention, some of the base channels are divided into 7 channels each, with a bit rate of (25 Mbps/7) =3.57 Mbps, and other base channels are divided into 10 channels each, with a bit rate of (25 Mbps/10)=2.5 Mbps. If, for example, 16 base channels are divided into ten channels each and 23 base channels are divided into seven base channels each, there are 7×23=161 channels having a bit rate of 3.57 Mbps and 10×16=160 channels having a bit rate of 2.50 Mbps. The total capacity of the channels is 161×3.57+160× 2.50=975 Mbps, which achieves a 98.3% efficiency from the 992 Mbps capacity of network 106.

In another exemplary embodiment of the invention, a base bit rate of 10 Gbps is used for 240×QAM256 streams. As is known in the art, each QAM256 stream has a payload of 38.8 Mbps. Assuming a header overhead of 3.5% for UDP/IP/ MAC headers, each stream requires 40.16 Mbps.

In some embodiments of the invention, as described above, all the channels carry video streams. Alternatively, some or all of the channels carry other types of data. In some embodiments of the invention, some of the channels are pre-assigned for video channels, while other channels are used for other types of data. In some embodiments of the invention, real time channels (e.g., real time video channels) are distributed throughout the cycles rather than being concentrated, so that variations in the data amounts of the real time channels do not disrupt their timing, as when necessary bandwidth of neighboring channels may be used.

It is noted that when the bandwidth utilization is low, one or more of the channels is a padding channel which does not carry meaningful data.

The media streams transmitted by VoD server 102 may include video streams, gaming streams, audio streams and/or any other types of real time media, including combined streams carrying data of a plurality of different types. Furthermore, while system 100 is described as being used for transmission from VoD server 102, the system and methods described above may be used for other types of servers and data sources (e.g., physical multiplexers) and for substantially any type of real time media, or even for other data for which accurate transmission timing is desired.

Alternatively to using padding packets, some of the gaps on the channel are filled by adding padding packets to data packets, for example at the end of the data packets. This alternative may be used, as discussed above for filling small gaps and/or may be used for longer gaps or even for filling all gaps, not using padding packets at all. It is noted, however, that removal of padding packets from data packets before the packets reach their destination is generally more complex than identifying padding packets. Therefore, this alternative, at least when used in large scale, is optionally used with switches or routers which are adapted to remove padding bytes from data packets and/or when the bandwidth utilized by the padding packets is not required for transmission of data (e.g., in a dedicated network).

It will be appreciated that the above described methods may be varied in many ways. For example, the reduction of transmitter jitter may be performed for substantially any type of transmitter, including media servers, web servers and other types of servers and clients. The reduction of transmission jitter may be achieved with substantially any type of data including audio, text, code, images, multimedia, games and combinations thereof.

It should also be appreciated that the above described description of methods and apparatus are to be interpreted as including apparatus for carrying out the methods and methods of using the apparatus. The present invention has been described using non-limiting detailed descriptions of embodiments thereof that are provided by way of example and are not intended to limit the scope of the invention.

It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art. Furthermore, the terms "comprise," "include," "have" and their conjugates, shall mean, when used in the claims, "including but not necessarily limited to."

It is noted that some of the above described embodiments may describe the best mode contemplated by the inventors and therefore may include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the elements and limitations as used in the claims.

The invention claimed is:

1. A method of transmission over a packet based network, comprising:
   providing a plurality of data packets to be transmitted on the packet based network during a predetermined time interval;
   arranging the plurality of provided data packets in a single transmission block, at relative locations within the block, selected according to desired transmission times of the data packets, such that one or more gaps remain between at least some of the data packets;
   adding padding bytes to the transmission block in a manner which substantially fills the one or more gaps; and
   providing the block for transmission on the packet based network,
   wherein arranging the data in the transmission block comprises overwriting one or more padding packets with one or more data packets.

2. A method according to claim 1, wherein adding padding bytes to the transmission block comprises adding padding bytes to one or more of the data packets.

3. A method according to claim 1, wherein adding padding bytes to the transmission block comprises adding padding packets.

4. A method according to claim 3, wherein adding padding packets comprises adding packets having an error which causes them to be discarded by standard routers.

5. A method according to claim 3, wherein adding padding packets comprises adding packets in which the source address of the packet is the same as the-destination address of the packet or packets having a zero or one time to live value.

6. A method according to claim 3, wherein each padding packet has a size of at least 40 bytes.

7. A method according to claim 1, wherein adding padding bytes to the transmission block comprises adding such that the data packets and the padding bytes are together of a size substantially equal to a capacity of the packet based network during the predetermined time interval.

8. A method according to claim 7, wherein adding the padding bytes comprises adding such that the data packets and the padding bytes are together not smaller by more than 100 bytes from a capacity of the packet based network during the predetermined time interval.

9. A method according to claim 1, wherein adding the padding bytes comprises adding such that the provided data packets and padding bytes together occupy at least 99% of the capacity of the packet based network during the predetermined time interval.

10. A method of transmission over a packet based network, comprising:
provide a plurality of data packets to be transmitted on the packet based network during a predetermined time interval;
arranging the plurality of provided data packets in a single transmission block, at relative locations within the block, selected according to desired transmission times of the data packets, such that one or more gaps remain between at least some of the data packets;
adding padding bytes to the transmission block in a manner which substantially fills the one or more gaps; and
providing the block for transmission on the packet based network,
wherein the predetermined time interval is longer than 10 milliseconds.

11. A method according to claim 1, wherein providing the data packets comprises providing real time media packets.

12. A method according to claim 1, wherein providing the data packets to be transmitted comprises providing from a plurality of video streams having a same data rate.

13. A method according to claim 1, wherein providing the data packets to be transmitted comprises providing from a plurality of video streams, at least two of which have different data rates.

14. A method of transmission over a packet based network, comprising:
providing a plurality of data packets to be transmitted on the packet based network during a predetermined time interval;
arranging the plurality of provided data packets in a single transmission block, at relative locations within the block, selected according to desired transmission times of the data packets, such that one or more gaps remain between at least some of the data packets;
adding padding bytes to the transmission block in a manner which substantially fills the one or more gaps; and
providing the block for transmission on the packet based network,
wherein arranging the data packets comprises defining a plurality of channels, dividing the block into a plurality of cycles including a packet for each of the channels and placing a padding packet between each of the cycles.

15. A method of transmission over a packet based network, comprising:
providing a plurality of data packets to be transmitted on the packet based network during a predetermined time interval;
arranging the plurality of provided data packets in a single transmission block, at relative locations within the block, selected according to desired transmission times of the data packets, such that one or more gaps remain between at least some of the data packets;
adding padding bytes to the transmission block in a manner which substantially fills the one or more gaps; and
providing the block for transmission on the packet based network,
wherein adding the padding bytes comprises adding after the data packets were arranged in the block.

16. A method of transmission over a packet based network, comprising:
providing a plurality of data packets to be transmitted on the packet based network during a predetermined time interval;
arranging the plurality of provided data packets in a single transmission block, at relative locations within the block, selected according to desired transmission times of the data packets, such that one or more gaps remain between at least some of the data packets;
adding padding bytes to the transmission block in a manner which substantially fills the one or more gaps; and
providing the block for transmission on the packet based network,
wherein adding the padding bytes comprises adding at least one padding packet to the block before the data packets were arranged in the block.

17. A packet based network transmitter, comprising:
a packet based network interface;
a data input unit; and
a processor adapted to arrange data packets received through the data input unit for transmission through the packet based network interface during a predetermined time into a block according to desired transmission times of the packets, with one or more gaps between the data packets, and to add padding bytes to the one or more gaps in a manner which substantially fills the one or more gaps,
wherein the packet based network interface is configured to be periodically initiated to consecutively transmit the packets in the block, with a period of less than 20 times a second.

18. A transmitter according to claim 17, wherein the block has a size of at least 99% of the capacity of the network interface during the predetermined time.

19. A transmitter according to claim 17, wherein the network transmitter comprises a VoD server or a physical multiplexer.

* * * * *